(12) United States Patent
Wu (10) Patent No.: US 6,694,964 B2
(45) Date of Patent: Feb. 24, 2004

(54) BARBECUE GRILL ASSEMBLY WITH A FOLDABLE SIDE RACK

(75) Inventor: Tsan-Kuen Wu, Tainan Hsien (TW)

(73) Assignee: Tsann Kuen USA Inc., Pasadena, CA (US)

( * ) Notice: Subject to any disclaimer, the term of this patent is extended or adjusted under 35 U.S.C. 154(b) by 349 days.

(21) Appl. No.: 09/932,417

(22) Filed: Aug. 16, 2001

(65) Prior Publication Data

US 2003/0034024 A1 Feb. 20, 2003

(51) Int. Cl.⁷ ............................. F24C 15/16; A47B 1/04
(52) U.S. Cl. .................. 126/25 R; 126/41 R; 126/334; 248/240.4; 108/77; 108/78; 16/349; 16/350
(58) Field of Search ........................... 126/38, 334, 50, 126/37 A, 40, 37 B, 39 R, 333, 41 R, 25 R, 37 R, 304 R, 304 A, 305, 306; 108/69, 76, 77, 78, 90, 6; 16/321, 319, 349, 350, 333, 324, 326, 327, 331, 352, 348, 361, 360, 357, 358; 211/99, 94.01, 100, 118, 96, 119.005, 119.006, 119.007, 126.15, 130.1, 170, 171; 248/239, 240.4, 292.14, 291.1, 284.1, 286.1

(56) References Cited

U.S. PATENT DOCUMENTS

| 163,661 A | * | 5/1875 | Keiper | 16/361 |
|---|---|---|---|---|
| 439,731 A | * | 11/1890 | Klineline | 126/334 |
| 532,791 A | * | 1/1895 | Kline | 126/334 |
| 662,946 A | * | 12/1900 | Kline. | 126/334 |
| 2,379,975 A | * | 7/1945 | Luger | 211/99 |
| 4,955,358 A | * | 9/1990 | Harris et al. | 126/25 R |
| 5,090,398 A | * | 2/1992 | Raymer et al. | 126/41 R |
| 5,941,228 A | * | 8/1999 | McKenzie | 126/25 R |

* cited by examiner

*Primary Examiner*—Carl D. Price
(74) *Attorney, Agent, or Firm*—Brinks Hofer Gilson & Lione (57) ABSTRACT

A barbecue grill assembly includes aside rack mounted foldably on a main frame, which has a mounting seat formed with an insert hole for access to a slide passage and installed with a resilient locking pin and an operating shaft coupled to the locking pin. The side rack has an insert rod extending slidably into the slide passage and formed with an engaging groove for engaging the locking pin so as to retain the side rack at a horizontal unfolded position. The insert rod extends through a side hole portion of the insert hole when in the unfolded position. The operating shaft is operable against restoring action of the locking pin so as to disengage the locking pin from the insert rod. The insert rod is slidable outwardly and is turnable downwardly to extend through a bottom hole portion of the insert hole when disengaged from the locking pin.

5 Claims, 9 Drawing Sheets

BARBECUE GRILL ASSEMBLY WITH A FOLDABLE SIDE RACK

BACKGROUND OF THE INVENTION

1. Field of the Invention

The present invention relates to a barbecue grill assembly, more particularly to a barbecue grill assembly having a foldable side rack.

2. Description of the Related Art

Figure 1:
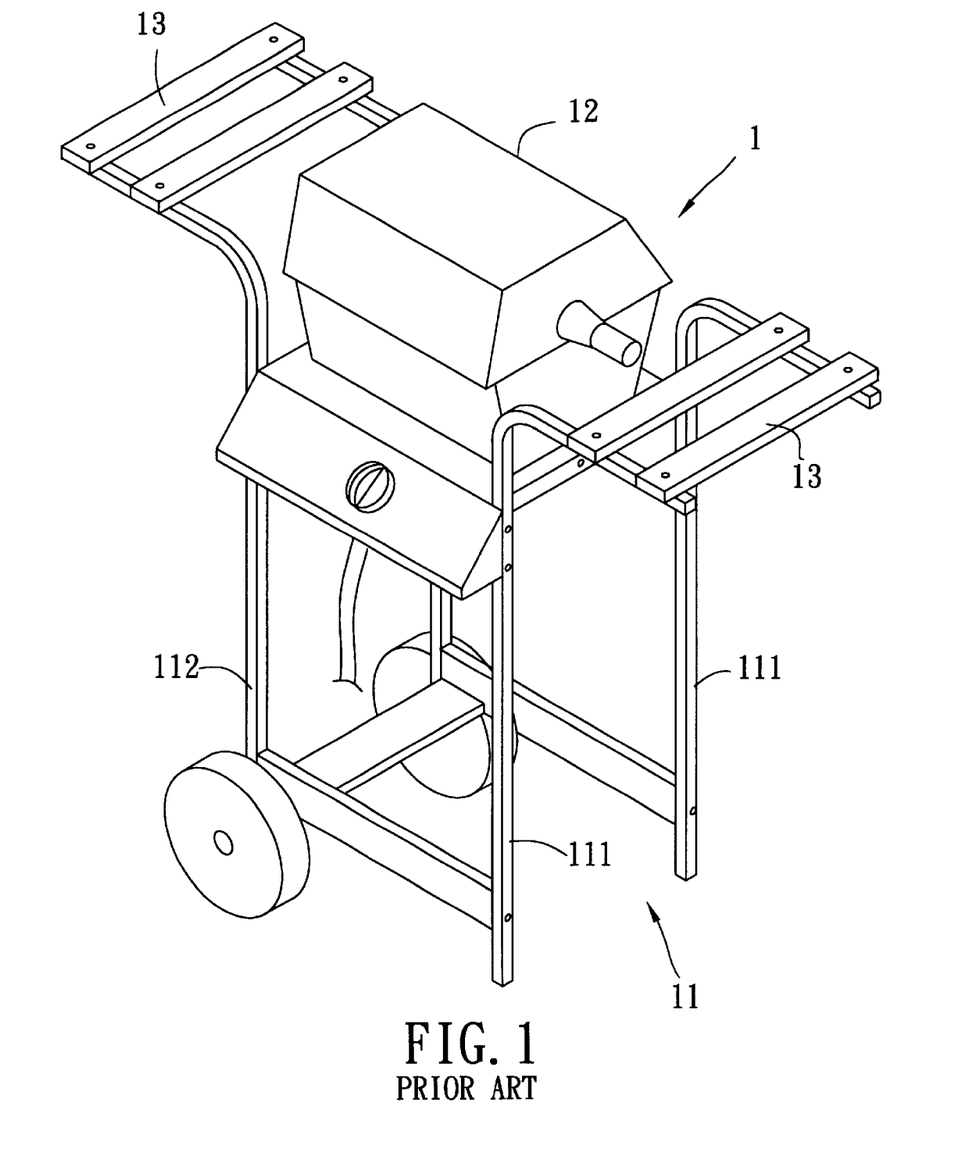
FIG. 1 is a perspective view of a conventional barbecue grill assembly.

FIG. 1 illustrates a conventional barbecue grill assembly 1 which includes a cooking unit 12, and a support unit 11 having upright leg members 111, 112 for supporting the cooking unit 12 above a ground surface. A pair of side racks 13 are provided fixedly on the support unit 11 at left and right sides of the cooking unit 12 to permit placing of various barbecue utensils thereon. Since the side racks 13 extend from the leg members 111, 112 and are unfoldable, the barbecue grill assembly 1 thus occupies a relatively large amount of storage space when it is not in use.

SUMMARY OF THE INVENTION

Therefore, the main object of the present invention is to provide a barbecue grill assembly having a side rack which can be locked at an unfolded position when in use and which can be easily folded when not in use.

Accordingly, the barbecue grill assembly of the present invention includes a horizontal main frame, a resilient locking pin, an operating shaft, and a side rack. The main frame has a lateral frame portion provided with a mounting seat which is formed with a vertical operating hole that has a top opening, a horizontally extending elongated slide passage, and a receiving groove. The mounting seat has a side wall that faces laterally outward, and a bottom wall that is connected to the side wall. The mounting seat is further formed with an insert hole which extends from the side wall to the bottom wall and which includes a side hole portion formed in the side wall and coaxial with the slide passage, and a bottom hole portion formed in the bottom wall and communicated with the side hole portion. The locking pin is received in the mounting seat, and has a first end disposed fixedly in the mounting seat, a second end opposite to the first end, and an intermediate portion between the first and second ends. The intermediate portion extends across the slide passage, and is registered with the receiving groove. The operating shaft has a lower actuating end extending into the operating hole in the mounting seat and coupled to the second end of the locking pin, and an upper operating end projecting from the mounting seat via the top opening. The side rack has an insert rod which extends slidably into the slide passage of the mounting seat via the insert hole and which has an engaging end portion that is retained in the slide passage and that is formed with a peripheral engaging groove. The intermediate portion of the locking pin engages the engaging groove in the engaging end portion of the insert rod when the insert rod is extended into the slide passage, thereby retaining the side rack at a horizontal unfolded position, in which the insert rod extends horizontally through the side hole portion of the insert hole. The operating end of the operating shaft is operable against restoring action of the locking pin for moving the intermediate portion of the locking pin into the receiving groove so as to disengage the locking pin from the engaging groove of the insert rod, thereby permitting the insert rod to slide along the slide passage in an outward direction away from the main frame. The insert rod is turnable downwardly when the engaging end portion is registered with the bottom hole portion such that the insert rod extends downwardly through the bottom hole portion, thereby disposing the side rack at a vertical folded position.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 2:
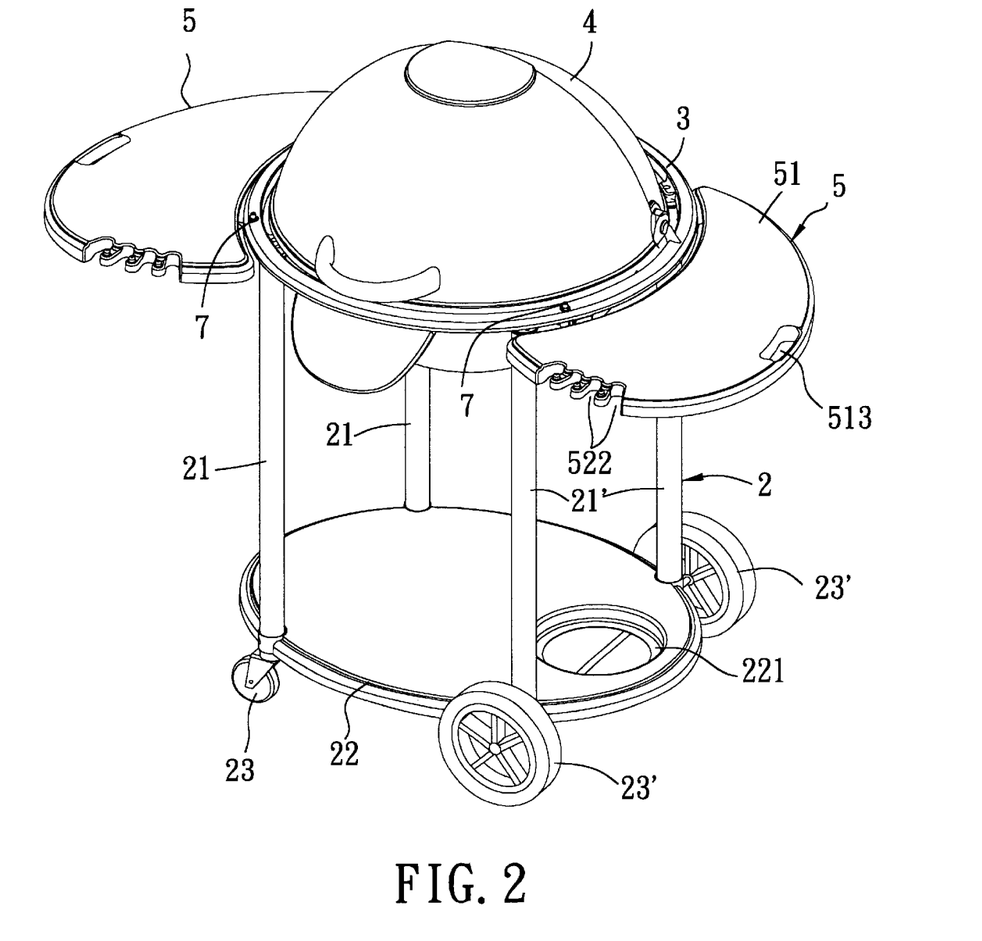
FIG. 2 is a perspective view of a preferred embodiment of a barbecue grill assembly of the present invention.

Referring to FIG. 2, the preferred embodiment of a barbecue grill assembly of the present invention is shown to include a horizontal main frame 3, a wheeled leg unit 2 for supporting movably the main frame 3 on a ground surface, and a pair of side racks 5 mounted foldably on left and right sides of the main frames 3.

The main frame 3 is annular in shape in the present embodiment, and is adapted for mounting a barbecue grill member (shown to be hidden below a lid 4) thereon. The leg unit 2 includes a pair of first legs 21 mounted with a pair of first wheels 23 on their lower ends, and a pair of second legs 21' mounted with a pair of second wheels 23' on their lower ends. The first wheels 23 are rotatable in all directions on the ground surface, while the second wheels 23' are rotatable in only a predetermined direction along the ground surface. A horizontal bottom panel 22 is mounted among the legs 21, 21', and has a recessed portion 221 adapted for retaining a fuel tank (not shown) therein.

Figure 3:
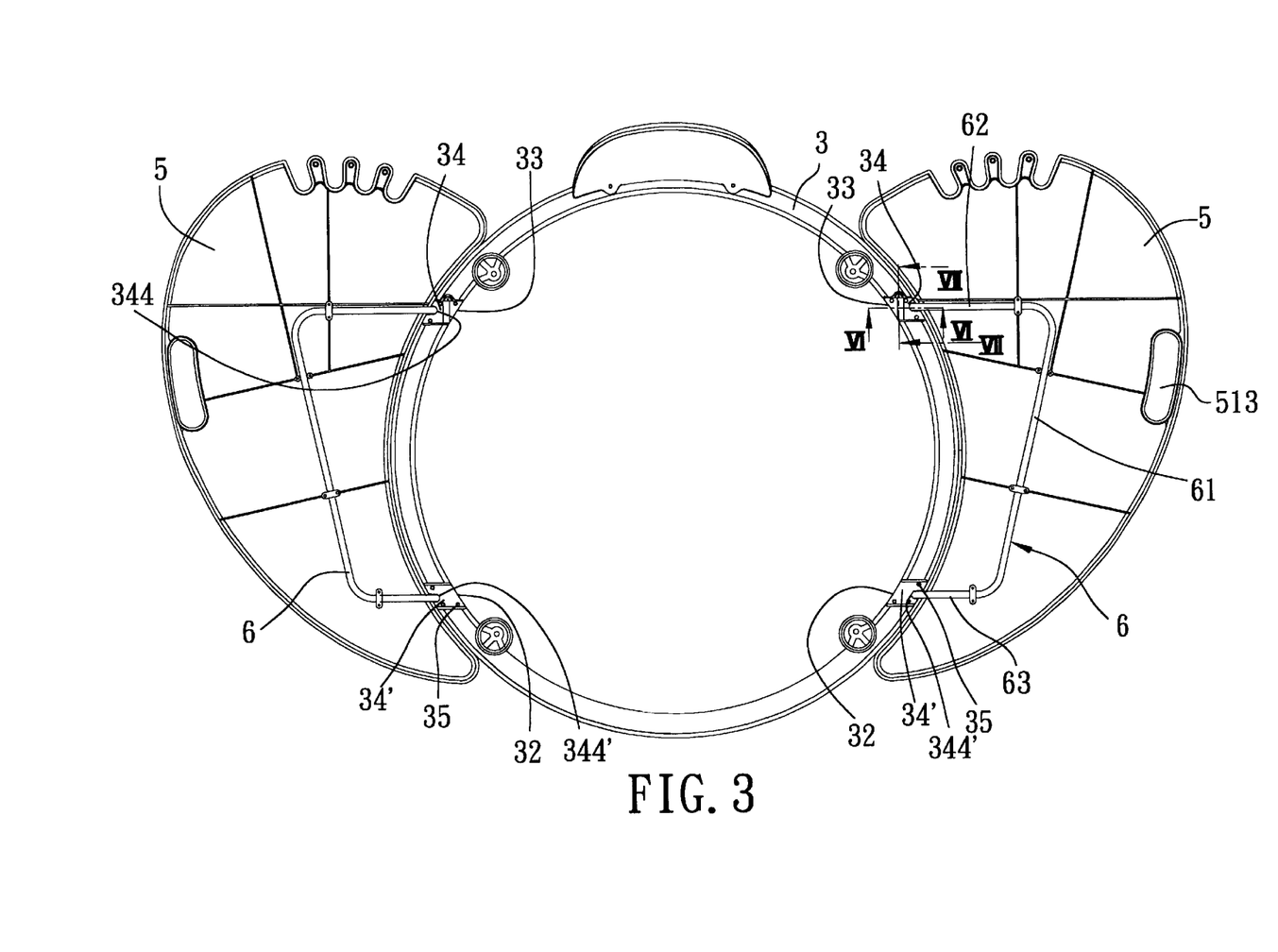
FIG. 3 is a schematic bottom view of the preferred embodiment when a pair of side racks thereof are in an unfolded state, and in which a wheeled leg unit is removed for the sake of clarity.
Figure 4:
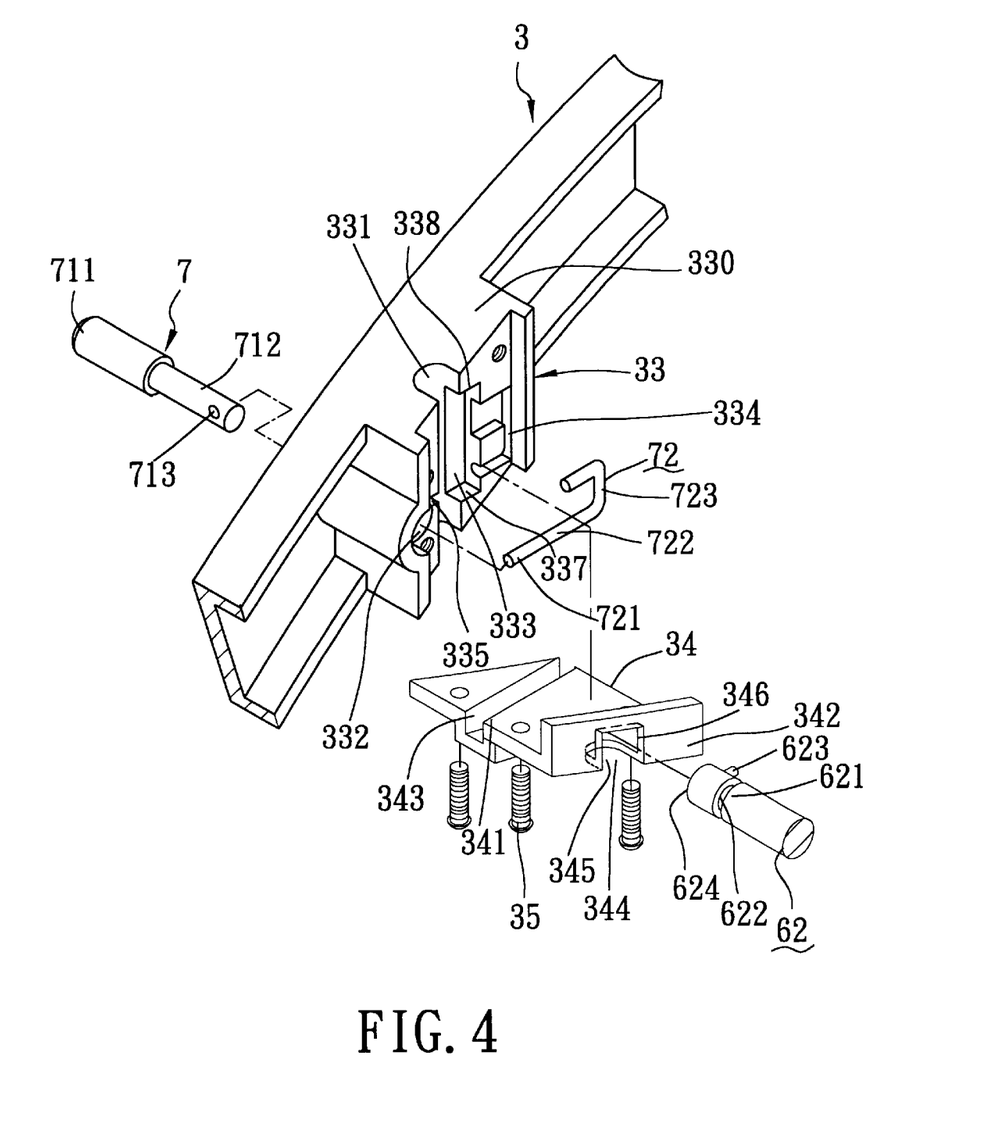
FIG. 4 is a fragmentary exploded perspective view illustrating a mounting seat of the preferred embodiment.
Figure 5:
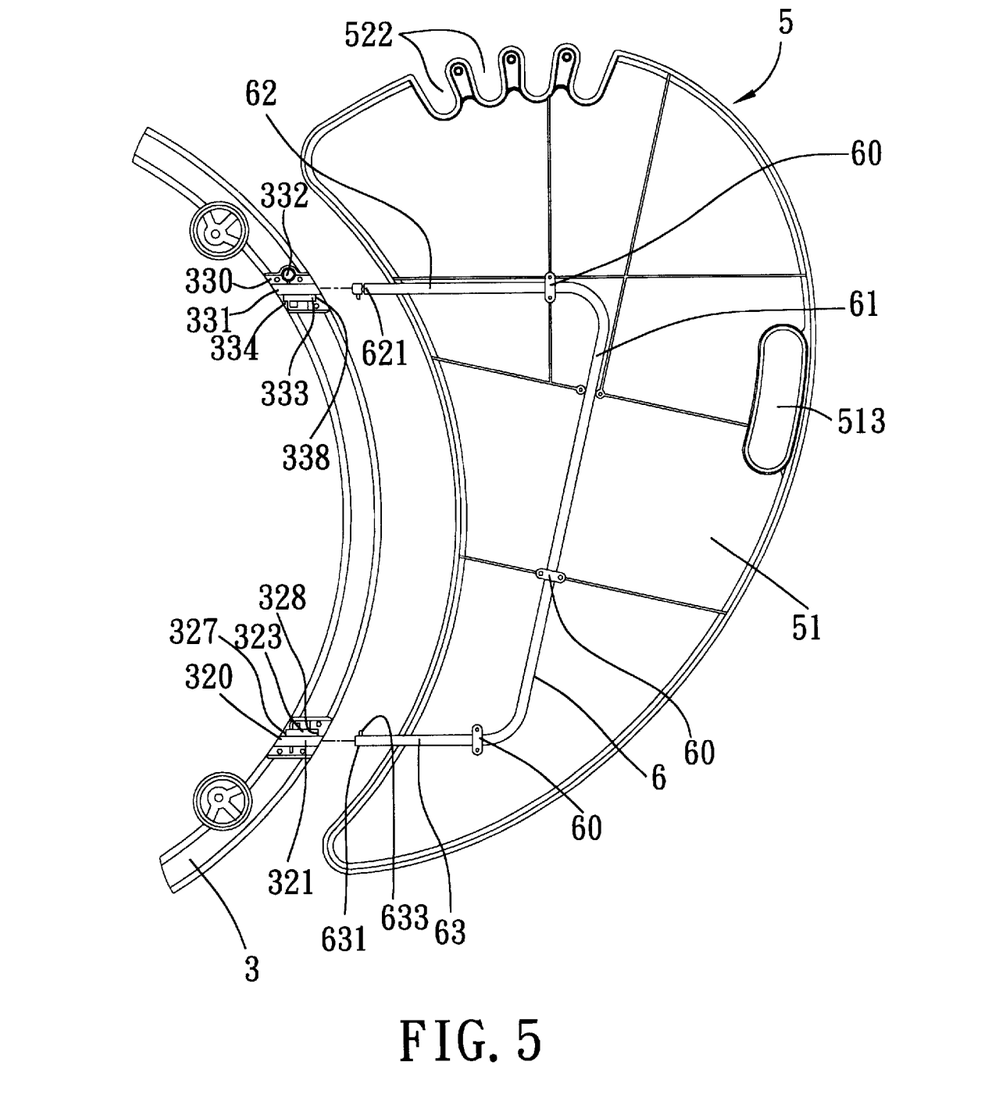
FIG. 5 is a fragmentary bottom view showing how the side racks are assembled to a main frame, where a pair of lower caps are removed for the sake of clarity.

Referring to FIGS. 3 to 5, the main frame 3 is formed from an annular metal strip, and is mounted on top of the legs 21, 21'. The main frame 3 has two lateral frame portions, each of which is provided with a first mounting seat 33 on a front part thereof, and a second mounting seat 32 on a rear part thereof. Each of the first and second mounting seats 33, 32 includes an upper seat portion 330, 320 formed integrally on a bottom side of the main frame 3, and a lower cap 34, 34' disposed below and fastened to the upper seat portion 330, 320 by screw rods 35.

The seat portion 330 of each of the first mounting seats 33 is formed with a vertical operating hole 332 with a top opening 36 (see FIG. 7) that opens at a top side of the main frame 3, a horizontally extending elongated slide passage 331, and a limiting groove 333 adjacent to and communicated with the slide passage 331. The limiting groove 333 extends parallel to the slide passage 331, and is defined between an upright inner limiting wall 337 proximate to an inner periphery of the main frame 3, and an upright outer limiting wall 338 proximate to an outer periphery of the main frame 3. The lower cap 34 of each of the first mounting seats 33 includes a flat bottom wall 341 attached closely to a bottom side of the seat portion 330, and a lateral side wall 342 connected transversely to the bottom wall 341 and disposed at the outer periphery of the main frame 3. The bottom wall 341 is formed with an elongated receiving groove 343. The lower cap 34 is formed with an insert hole 344 for access to the slide passage 331. The insert hole 344 extends from the lateral side wall 342 to the bottom wall 341, and includes a side hole portion 346 aligned with an axis of the slide passage 331, and a bottom hole portion 345 communicated with the side hole portion 346.

A resilient locking pin 72 is received in a respective one of the first mounting seats 33. The locking pin 72 has a first end 723 with an L-shaped configuration, a second end 721 opposite to the first end 723, and an intermediate portion 722 which extends straightly from the first end 723 to the second end 721. The upper seat portion 330 of each of the first mounting seats 33 is formed with a pin retaining slot 334 for retaining the locking pin 72. The pin retaining slot 334 has a communicating slot section 335 which is communicated with the operating hole 332 and which has the second end 721 of the locking pin 72 received therein. The intermediate portion 722 of the locking pin 72 extends across the slide passage 331. The L-shaped first end 723 of the locking pin 72 is clamped between the bottom wall 341 of the lower cap 34 and the bottom surface of the upper seat portion 330 of the mounting seat 33, and is thus disposed fixedly in the mounting seat 33. The intermediate portion 722 and the second end 721 of the locking pin 72 are registered with the receiving groove 343.

A pair of operating shafts 7 are inserted respectively into the operating holes 332 in the first mounting seats 33. Each of the operating shafts 7 has an upper operating end 711 projecting from the top opening 36 (see FIG. 7) of a respective one of the first mounting seats 33, and a lower actuating end 712 extending into the respective one of the first mounting seats 33 and formed with a pin hole 713 for coupling with the second end 721 of the locking pin 72. The operating end 711 of the operating shaft 7 is depressible to move the second end 721 and the intermediate portion 722 of the locking pin 72 downwardly into the receiving groove 343. When the pressing force applied on the operating shaft 7 is released, upward restoring action of the locking pin 72 results due to the resilient characteristics of the locking pin 72 to result in corresponding upward movement of the operating shaft 7.

The seat portion 320 of each of the second mounting seats 32 is formed with a horizontally extending elongated slide passage 321, and a limiting groove 323 adjacent to and communicated with the slide passage 321. The limiting groove 323 extends parallel to the slide passage 321, and is defined between an upright inner limiting wall 327 proximate to an inner periphery of the main frame 3, and an upright outer limiting wall 328 proximate to an outer periphery of the main frame 3. The lower cap 34' of each of the second mounting seats 32 has a structure similar to that of the lower caps 34 of the first mounting seats 33, except that the caps 34' of the second mounting seats 32 are not required to be formed with the receiving grooves 343. Likewise, the lower cap 34' is formed with an insert hole 344' for access to the slide passage 321. The insert hole 344' is similar to the insert hole 344 formed in the lower cap 34 of each of the first mounting seats 33, and includes intercommunicated side and bottom hole portions, as with the insert hole 344. The slide passages 321 in the second mounting seats 32 are parallel to the slide passages 331 in the first mounting seats 33.

Each of the side racks 5 is shown to include a U-shaped support frame 6 and a panel 51 disposed on and fastened to the support frame 6. The support frame 6 includes parallel first and second insert rods 62, 63 mounted on the first and second mounting seats 33, 32 of a respective one of the left and right frame portions of the main frame 3, and a connecting rod 61 extending transversely between the first and second insert rods 62, 63. The first and second insert rods 62, 63 and the connecting rod 61 are fastened to the bottom side of the panel 51 by fasteners 60. The panel 51 has a front edge portion formed with a plurality of grooves 522 to permit hooking of various barbecue utensils thereon. The panel 51 further has a lateral outer edge portion distal to the main frame 3 and formed with a finger hole 513 for extension of fingers of the user therethrough to permit gripping of the panel 51.

The first insert rod 62 of the support frame 6 of each of the side racks 5 is extended into the slide passage 331 in a respective one of the first mounting seats 33 via the insert hole 344 in the respective first mounting seat 33, and is slidable along the slide passage 331. The first insert rod 62 has an engaging end portion 621 retained in the slide passage 331. The engaging end portion 621 has a rounded distal edge 624, and is formed with an annular peripheral engaging groove 622 and a pin projection 623 that is offset from the axis of the first insert rod 62. The second insert rod 63 of the support frame 6 of each of the side racks 5 extends into the slide passage 321 in a respective one of the second mounting seats 32 via the insert hole 344', and is slidable along the slide passage 321. The second insert rod 63 has an engaging end portion 631 retained in the slide passage 321 and formed with a pin projection 633 that is offset from the axis of the second insert rod 63.

Figure 6:
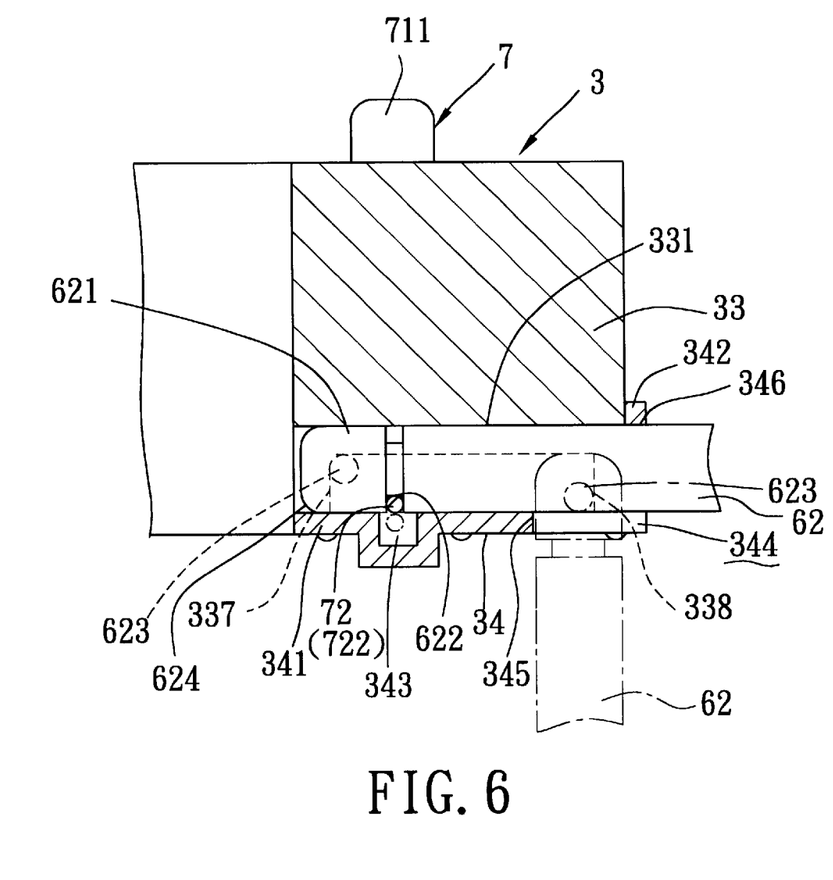
FIG. 6 is a fragmentary sectional view illustrating the mounting seat of the preferred embodiment, taken along line VI—VI in FIG. 3.
Figure 7:
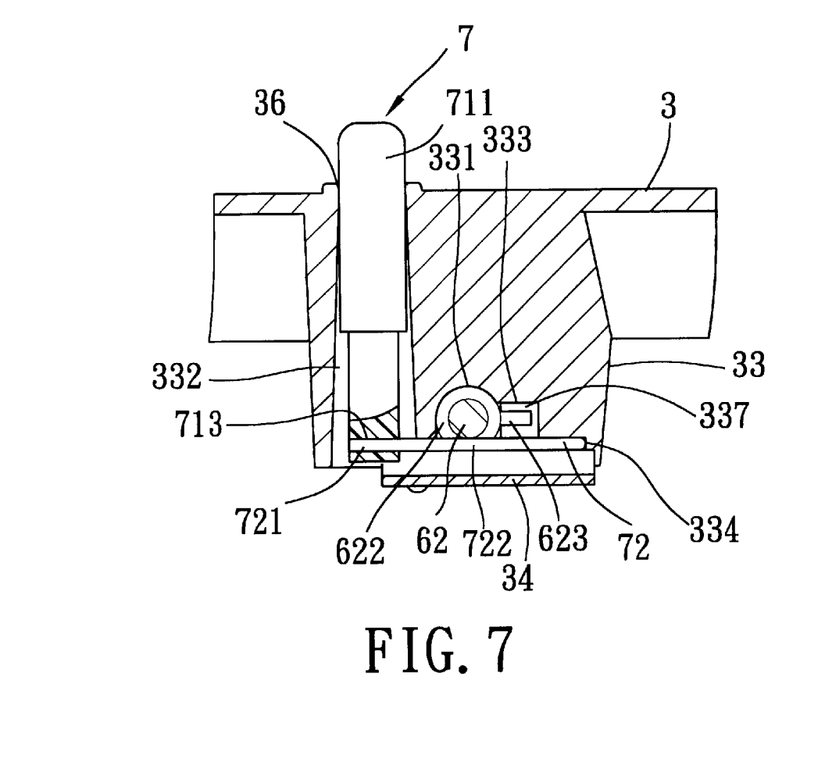
FIG. 7 is another fragmentary sectional view illustrating the mounting seat, taken along line VII—VII in FIG. 3.
Figure 8:
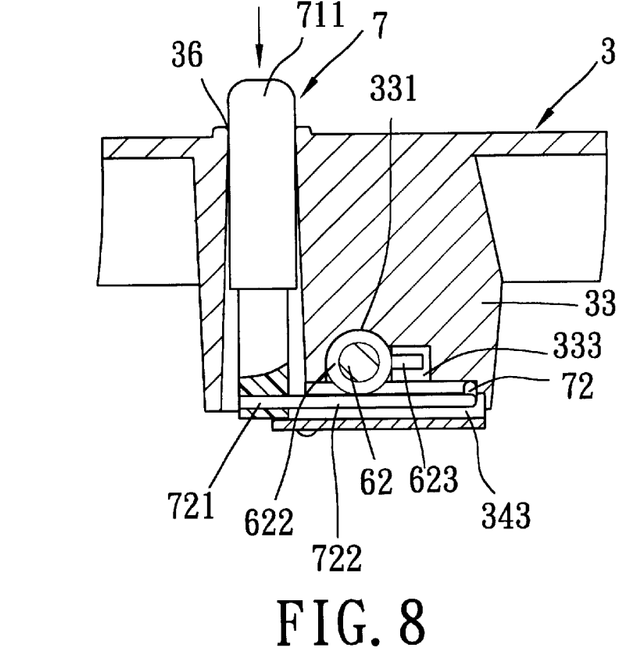
FIG. 8 is still another fragmentary sectional view, illustrating how an operating shaft is pressed to actuate a locking pin in the mounting seat.
Figure 9:
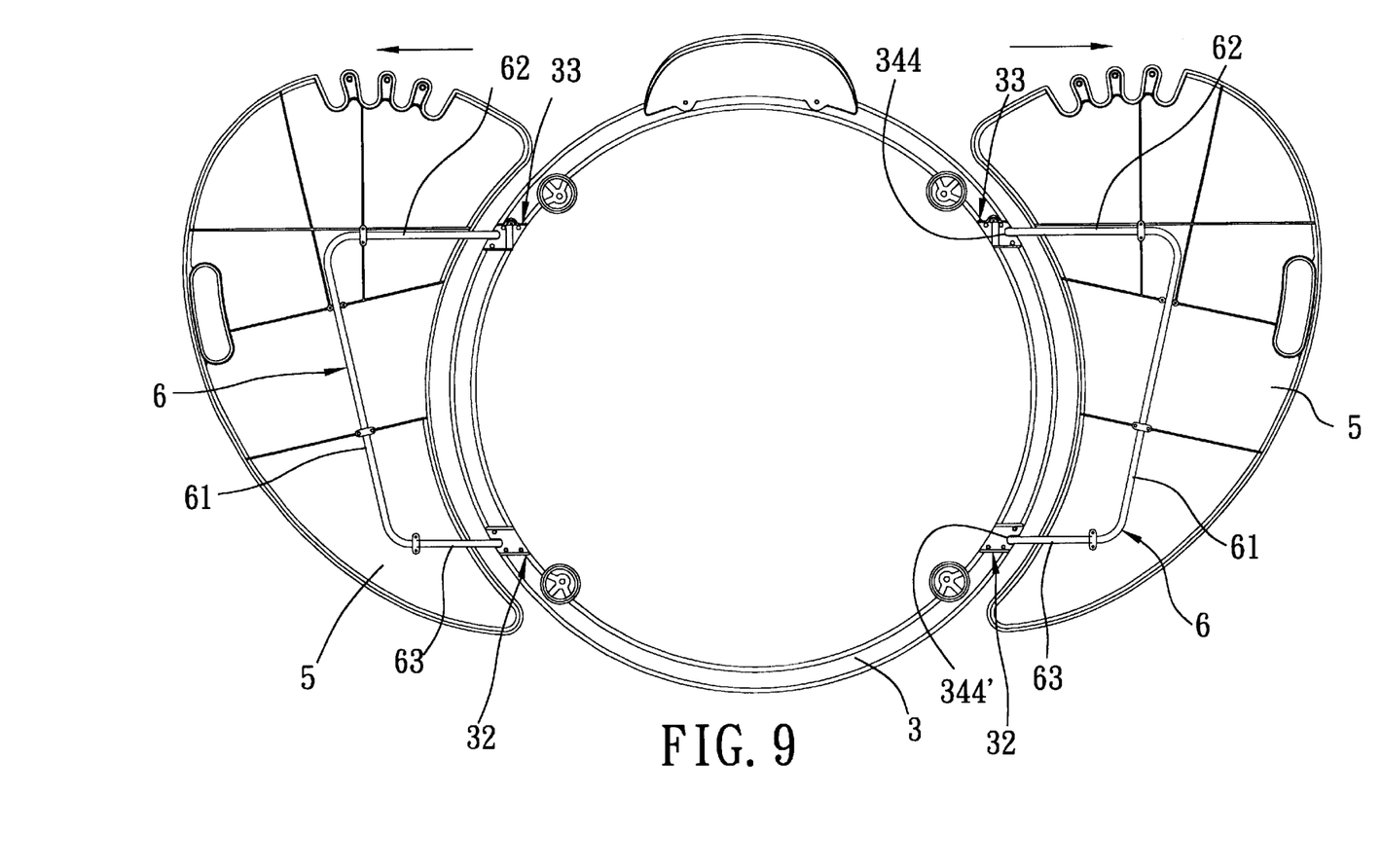
FIG. 9 is a schematic bottom view of the preferred embodiment with the wheeled leg unit removed therefrom, illustrating a folding operation of the side racks.
Figure 10:
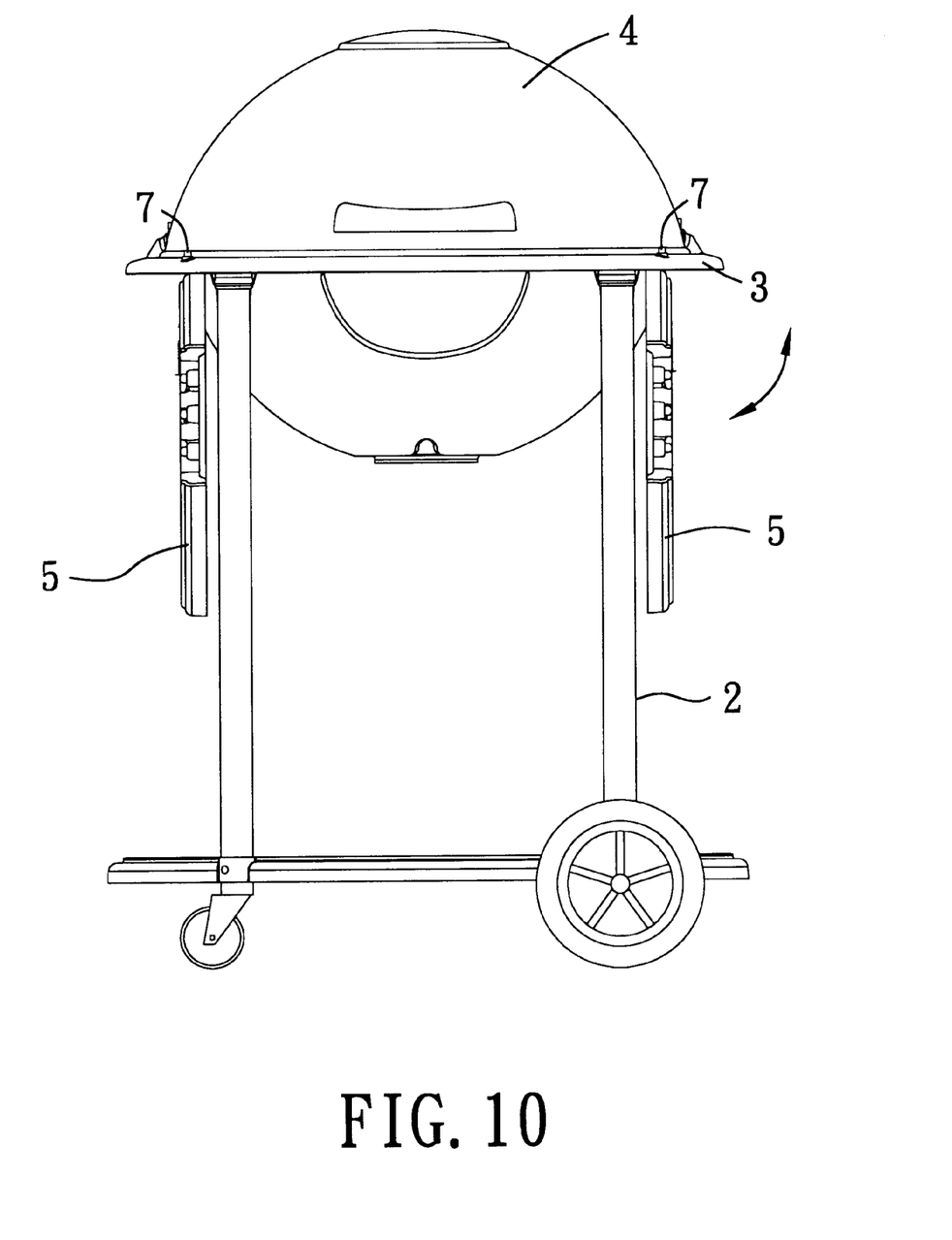
FIG. 10 is a front view of the preferred embodiment when the side racks are folded.

Referring to FIGS. 3, 6 and 7, when the first insert rod 62 of the support frame 6 of each of the side racks 5 is extended into the insert hole 344 in a respective one of the first mounting seats 33, the first insert rod 62 slides along the slide passage 331, and the rounded distal edge 624 of the engaging end portion 621 moves over the intermediate portion 722 of the locking pin 72 and slightly depresses the locking pin 72. When the engaging groove 622 in the engaging end portion 621 of the first insert rod 62 is registered with the locking pin 72, the locking pin 72 moves upwardly and engages the engaging groove 622. At this time, the side racks 5 are locked to the first mounting seats 33 at a horizontal unfolded position, in which the first and second insert rods 62, 63 extend horizontally through the side hole portions 346 of the insert holes 344, 344' in the first and second mounting seats 33, 32. Referring to FIGS. 6, 8 and 9, to fold the side racks 5, the operating end 711 of each of the operating shafts 7 is pressed to actuate downward movement of the second end 721 and the intermediate portion 722 of the locking pin 72 into the receiving groove 343, thereby disengaging the locking pin 72 from the engaging groove 622 of the first insert rod 62. Then, the side racks 5 are pulled outwardly away from the main frame 3 such that the first and second insert rods 62, 63 slide outwardly along the slide passages 331, 321 (see FIG. 5) of the first and second mounting seats 33, 32. The pin projection 623, 633 on the engaging end portions 621, 631 of the first and second insert rods 62, 63 slide along the limiting grooves 333, 323, and then abut against the limiting walls 338, 328, which are proximate to the insert holes 344, 344', to prevent removal of the first and second insert rods 62, 63 from the first and second mounting seats 33, 32 via the side hole portions 346 of the insert holes 344, 344'. Thereafter, the side racks 5 are turned downwardly such that the first and second insert rods 62, 63 move from the side hole portions 346 to the bottom hole portions 345 of the insert holes 344, 344' and extend downwardly from the bottom hole portions 345 (shown by phantom lines in FIG. 6), thereby disposing the side racks 5 at a folded position, in which the side racks 5 are oriented vertically and extend downwardly from left and right sides of the main frame 3, as shown in FIG. 10. At this time, the pin projections 623, 633 abut against the bottom walls 341 of the lower caps 34, 34' at peripheries of the bottom hole portions 345 to prevent downward removal of the first and second insert rods 62, 63 from the first and second mounting seats 33, 32.

To once again unfold the side racks 5, the side racks 5 are turned upwardly to align the first and second insert rods 62, 63 with the side hole portions 346 of the insert holes 344, 344' and are then pushed inwardly toward the main frame 3 such that the first and second insert rods 62, 63 slide inwardly along the slide passages 331, 321 until the locking pins 72 engage the engaging grooves 622 in the engaging end portions 621 of the first insert rods 62. The side racks 5 are thus retained in the unfolded position once again.

Optionally, the second mounting seats 32 may be provided with the operating shafts 7 and the locking pins 72, and the engaging end portions 631 of the second insert rods 63 may be formed with engaging grooves for engaging the locking pins 72. In other embodiments, the barbecue grill assembly may be installed with a single side rack 5. In this case, the main frame 3 is only formed with a single first mounting seat 33 and a single second mounting seat 32 at a corresponding left/right frame portion thereof.

With the use of the present invention, the side racks 5 can be folded downwardly toward the leg unit 2 by simply pressing the operating shafts 7. The storage space occupied by the barbecue grill assembly of the present invention can be significantly reduced when compared with the prior art described hereinabove.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A barbecue grill assembly comprising:
    a horizontal main frame having a lateral frame portion provided with a first mounting seat which is formed with a vertical operating hole that has a top opening, a horizontally extending elongated slide passage, and a receiving groove, said first mounting seat having a side wall that faces laterally outward, and a bottom wall that is connected to said side wall, said first mounting seat being further formed with an insert hole which extends from said side wall to said bottom wall and which includes a side hole portion formed in said side wall and coaxial with said slide passage, and a bottom hole portion formed in said bottom wall and communicated with said side hole portion;
    a resilient locking pin received in said first mounting seat, said locking pin having a first end disposed fixedly in said first mounting seat, a second end opposite to said first end, and an intermediate portion between said first and second ends, said intermediate portion extending across said slide passage and being registered with said receiving groove;
    an operating shaft having a lower actuating end extending into said operating hole in said first mounting seat and coupled to said second end of said locking pin, and an upper operating end projecting from said first mounting seat via said top opening; and
    a side rack having a first insert rod which extends slidably into said slide passage of said first mounting seat via said insert hole and which has an engaging end portion that is retained in said slide passage and that is formed with a peripheral engaging groove,
    said intermediate portion of said locking pin engaging said engaging groove in said engaging end portion of said first insert rod when said first insert rod is extended into said slide passage, thereby retaining said side rack at a horizontal unfolded position, in which said first insert rod extends horizontally through said side hole portion of said insert hole,
    said operating end of said operating shaft being operable against restoring action of said locking pin for moving said intermediate portion of said locking pin into said receiving groove so as to disengage said locking pin from said engaging groove of said first insert rod, thereby permitting said first insert rod to slide along said slide passage in an outward direction away from said main frame, said first insert rod being turnable downwardly when said engaging end portion is registered with said bottom hole portion such that said first insert rod extends downwardly through said bottom hole portion, thereby disposing said side rack at a vertical folded position.

2. The barbecue grill assembly as claimed in claim 1, wherein said first mounting seat includes an upper seat portion formed with said operating hole and said slide passage, and a lower cap disposed below and fastened to said upper seat portion, said lower cap being formed with said bottom wall and said lateral side wall, said first end of said locking pin being clamped between said bottom wall and said upper seat portion, said bottom wall of said lower cap being formed with said receiving groove, said operating end of said operating shaft being depressible to actuate downward movement of said locking pin into said receiving groove, said locking pin moving upwardly when depressing force applied on said operating shaft is removed.

3. The barbecue grill assembly as claimed in claim 1, wherein said engaging end portion of said first insert rod is further formed with a pin projection offset from an axis of said first insert rod, said first mounting seat being further formed with a limiting groove adjacent to and communicated with said slide passage, said limiting groove extending parallel to said slide passage, said pin projection being slidable within said limiting groove when said first insert rod slides along said slide passage, said first mounting seat having an upright limiting wall that defines one end of said limiting groove and that is disposed proximate to said insert hole, said pin projection abutting against said limiting wall to prevent removal of said first insert rod from said side hole portion of said insert hole when said first insert rod slides outwardly along said slide passage, said pin projection abutting against said bottom wall of said first mounting seat at a periphery of said bottom hole portion to prevent removal of said first insert rod from said first mounting seat when said first insert rod turns downwardly.

4. The barbecue grill assembly as claimed in claim 1, wherein said lateral frame portion of said main frame is further provided with a second mounting seat which has an elongated slide passage parallel to said slide passage in said first mounting seat, said second mounting seat having a side wall that faces laterally outward, and a bottom wall that is connected to said side wall of said second mounting seat, said second mounting seat being formed with an insert hole which extends from said side wall to said bottom wall of said second mounting seat and which includes a side hole portion formed in said side wall of said second mounting seat and coaxial with said slide passage in said second mounting seat, and a bottom hole portion formed in said bottom wall of said second mounting seat and communicated with said side hole portion, said side rack further having a second insert rod with an engaging end portion retained in said slide passage of said second mounting seat, said second insert rod being slidable together with said first insert rod along said slide passage of said second mounting seat, said second insert rod being turnable downwardly together with said first insert rod when said engaging end portion of said second insert rod is registered with said bottom hole portion in said second mounting seat such that said second insert rod extends downwardly through said bottom hole portion in said second mounting seat.

5. The barbecue grill assembly as claimed in claim 4, wherein said engaging end portion of each of said first and second insert rods is further formed with a pin projection offset from an axis of a respective one of said first and second insert rods, each of said first and second mounting seats being further formed with a limiting groove adjacent to and communicated with said slide passage, said limiting groove extending parallel to said slide passage, said pin projections of said first and second insert rods being slidable within said limiting grooves when said first and second insert rods slide along said slide passages in said first and second mounting seats, each of said first and second mounting seats having an upright limiting wall that defines one end of said limiting groove and that is disposed proximate to said insert hole, said pin projections of said insert rods abutting against said limiting walls to prevent removal of said first and second insert rods from said side hole portions of said insert holes of said first and second mounting seats when said first and second insert rods slide outwardly along said slide passages of said first and second mounting seats, said pin projections abutting against said bottom walls of said first and second mounting seats at peripheries of said bottom hole portions to prevent removal of said first and second insert rods from said first and second mounting seats when said first and second insert rods turn downwardly.

* * * * *